United States Patent
Nijo

[15] 3,703,086
[45] Nov. 21, 1972

[54] TEMPERATURE-REGULATING SYSTEM IN APPARATUSES FOR MAINTAINING TEMPERATURE CONSTANT

[72] Inventor: Kiyoichi Nijo, Osaka, Japan
[73] Assignee: Naniwa Sangyo Co., Ltd., Osaka, Japan
[22] Filed: Feb. 11, 1971
[21] Appl. No.: 114,534

[30] Foreign Application Priority Data
March 11, 1970 Japan ..................... 45/21135
Aug. 5, 1970 Japan ..................... 45/68904

[52] U.S. Cl. ......................... 62/209, 62/227, 236/78
[51] Int. Cl. ............................................. F25b 41/00
[58] Field of Search......... 62/139, 203, 204, 209, 210, 62/213, 222–225, 227, 156; 236/78

[56] References Cited

UNITED STATES PATENTS 2,524,813  10/1950  Lathrop ..................... 62/213
3,335,576  8/1967   Phillips ..................... 62/156
3,097,502  7/1963   Krueger ..................... 62/209

Primary Examiner—Meyer Perlin
Attorney—Dawson, Tilton, Fallon & Longmus

[57] ABSTRACT

A temperature-regulating system in apparatuses for maintaining temperature constant such as domestic refrigerators, usual refrigerators, heating apparatuses for living rooms, air conditioning apparatuses or the like wherein a heat-exchanger regulating apparatus or machine is initiated and stopped differentially at the points of time when a first temperature-detecting device attached to a heat-exchanger detects a first predetermined temperature and when any one of a second temperature-detecting device provided outside said heat-exchanger detects a second or third predetermined temperature so as to maintain a desired constant temperature. Changes in the atmospheric temperature is compensated well owing to the presence of said third temperature-detecting device whereby said desired constant temperature is always maintained automatically.

6 Claims, 6 Drawing Figures

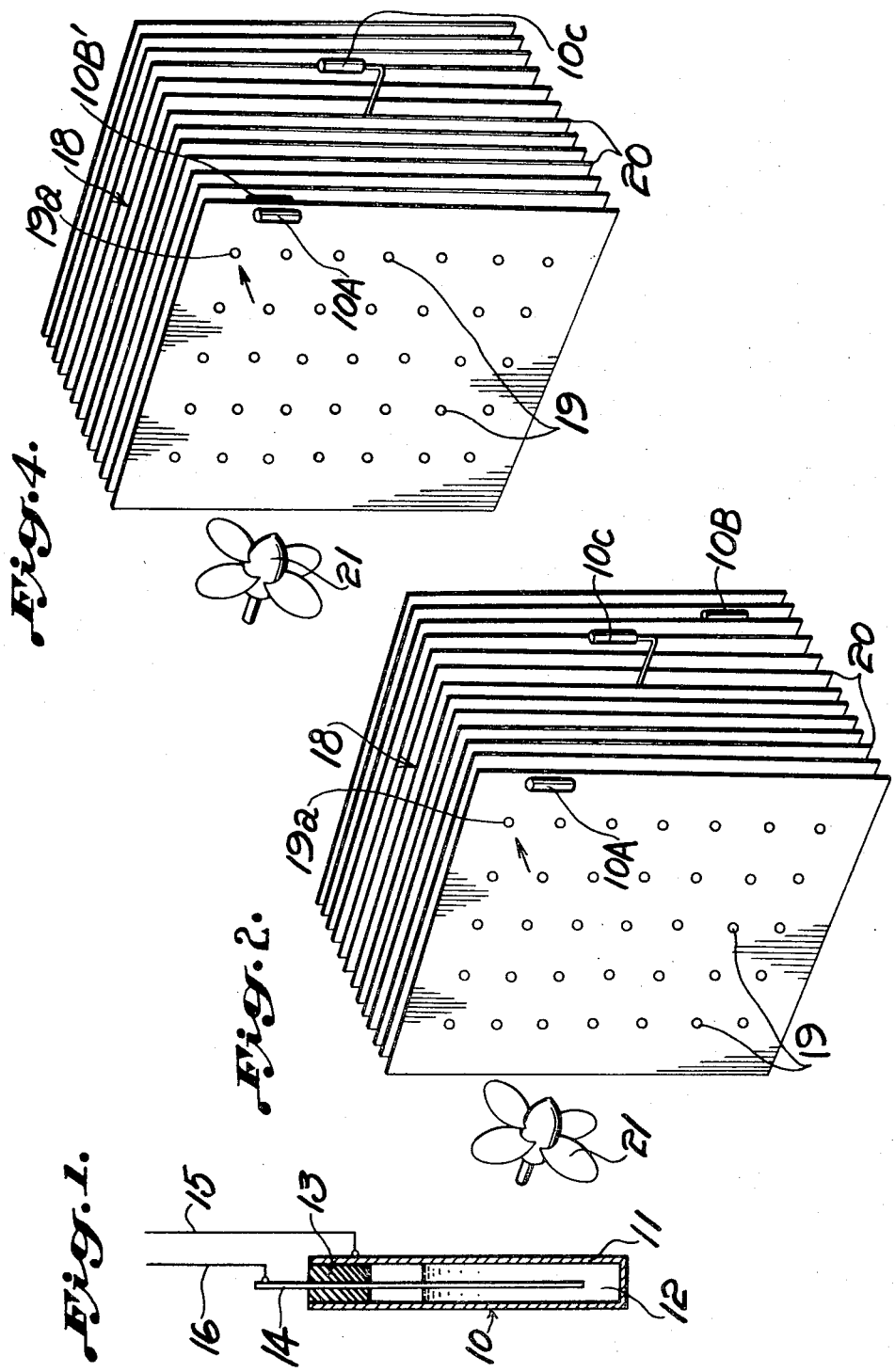

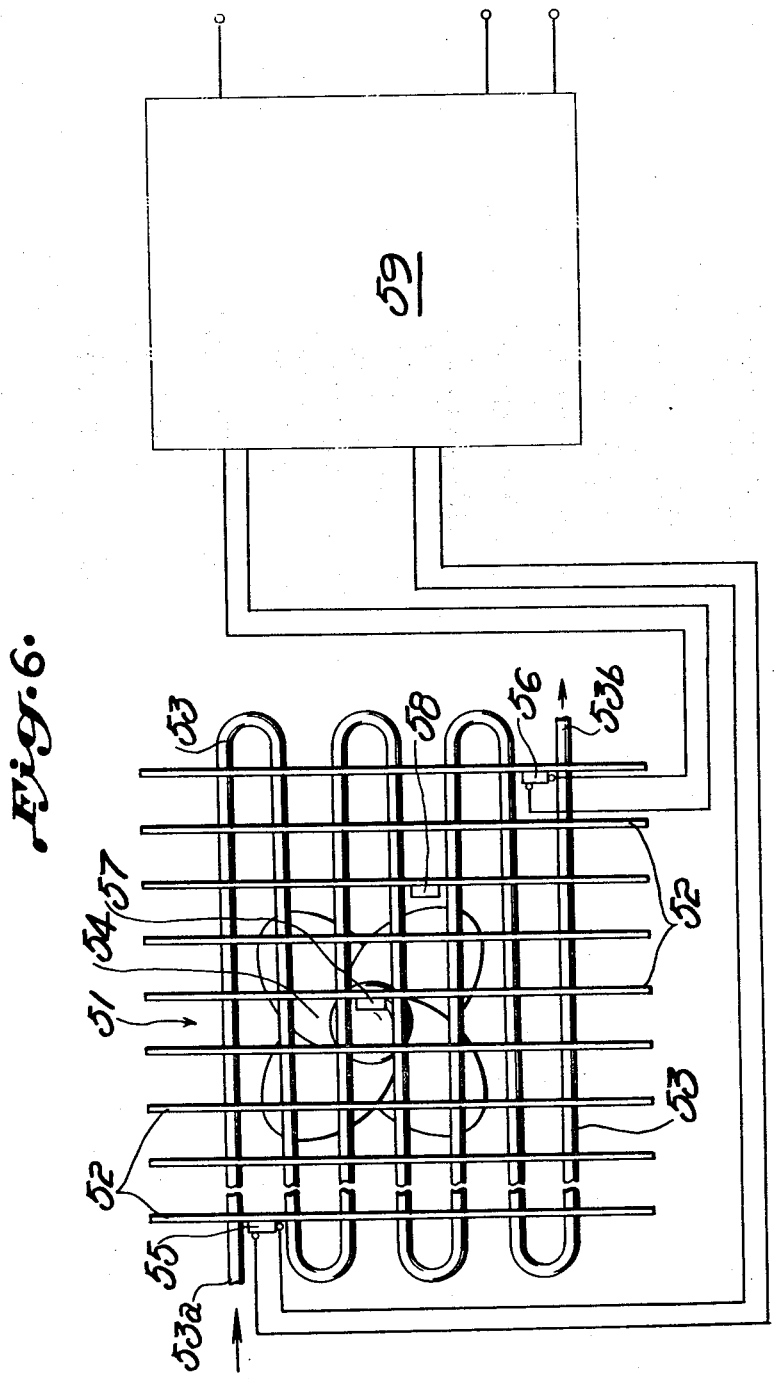

3,703,086

TEMPERATURE-REGULATING SYSTEM IN APPARATUSES FOR MAINTAINING TEMPERATURE CONSTANT

This invention relates to a novel temperature-regulating system in apparatuses for maintaining temperature constant, and more particularly to a temperature-regulating system which compensates changes in atmospheric temperature in seasons of a year and in times of a day well so that a desired constant temperature is always maintained. The terms "apparatuses for maintaining temperature constant" in this specification mean such apparatuses that are used for maintaining temperatures in defined chambers constant. Examples of such apparatuses are domestic refrigerators or usual refrigerators in which desired low temperatures are always maintained, heating apparatuses for living rooms, air conditioning apparatuses and the like.

In such apparatuses for maintaining temperature constant, it is very important to accomplish regulation of temperature which never depends on the atmospheric temperature. The circumstances will be detailed by taking the domestic refrigerator shown in FIG. 6 as an example. In the domestic refrigerator shown in FIG. 6, there is provided a circulation coolant pipe 53 to which a number of spaced cooling fins 52 are fixedly attached whereby a heat-exchanger consisting of the coolant pipe 53 and the cooling fins 52 is formed in the cooling portion 51 of the domestic refrigerator. The air in the refrigerator is cooled with the heat-exchange between thus formed heat-exchanger and the air and temperature in each position in the refrigerator is brought uniform with convection air-currents forcedly caused by a fan 54. Although the above cooling system with a cooling heat-exchanger and a means for forcedly causing convection air-currents exhibits a high efficiency of cooling, a temperature-detecting device is usually provided in the air in the domestic refrigerator. The operation of a heat-exchanger regulating apparatus or machine such as cooling machine or the like is generally initiated and stopped at a desired temperature detected by said temperature-detecting device so as to regulate the temperature in the refrigerator even when the load of moisture or the atmospheric temperature is high, which causes a rapid frosting of moisture in the refrigerator at the cooling portion 51 from the inlet side of the coolant pipe 53 toward the outlet side of said pipe. Frost then attaches on and covers the overall heat-exchanger very rapidly whereby, as well known to the art, the forced air cooling becomes impossible.

Provided that the atmospheric temperature is always constant, it is effective to employ the following system for regulating temperature as shown in Japanese Pat. publication No. 21,074/70, U.S. Pat. No. 3,514,735, French Pat. No. 1,559,841, Italian Pat. No. 827,939 and British Pat. No. 1,190,671 by the inventor of the present invention. That is, a pair of temperature-detecting devices are fixedly attached to the cooling fin of a domestic refrigerator at the inlet side and the outlet side thereof respectively and cooling operation is initiated and stopped differentially at the points of time when the temperature-detecting devices detect a predetermined temperature respectively as is clarified hereinafter in conjunction with FIG. 6. In the system shown in FIG. 6, temperature-detecting devices 55 and 56 are fixedly attached to the cooling fin 52 at the positions near the inlet 53a and outlet 53b of the pipe 53 respectively. Each of said detecting devices 55 and 56 is so constructed that it performs a switching operation at the lowest temperature which results in defrosting. A regulating electric circuit 59 connected to each of the devices 55 and 56 is so constructed that cooler for the coolant or cooling medium circulated through the pipe 53 is operated when both of the temperatures at each of the temperature-detecting devices 55 and 56 are higher than the aforementioned switching temperature of the devices. The cooler is also operated when the temperature of the device 56 at the outlet side is still higher than said switching temperature after the device 55 at the inlet side has detected the switching temperature, and the operation of the cooler is stopped at the point of time when the device 56 performs the switching operation at said switching temperature. In this stopped state of the operation of the cooler, although the cooling portion 51 is fairly super-cooled and is covered with frost, a rapid defrosting is resulted by stopping the cooling operation and the air-current from the fan 54. The regulating circuit 59 is further so constructed that the operation of the cooler is not reopened so as to prompt the defrosting even when the detecting device 56 at the outlet side of the pipe 53 detects the switching temperature due to the rise in temperature of the heat-exchanger near the outlet 53b of the pipe 53. The cooling operation is not reopened until the detecting device 55 at the inlet side of the pipe 53 performs the switching operation by detecting the switching temperature due to the rise in temperature of the heat-exchanger near the inlet 53a, and the above operation of the temperature-regulating system is repeated. As can be understood from the above, temperature in a domestic refrigerator can be, when the atmospheric temperature is always constant, maintained approximately by initiating and stopping the cooling operation intermittently by using only two fixedly provided temperature-detecting devices 55 and 56.

In practice, however, the situations of cooling at the cooling portion 51 differs variously with changes in the atmospheric temperature, so that a temperature-regulating corresponding to or compensating the changes in the atmospheric temperature is never achieved by the regulating system detailed in the above. That is, a longer period of time of the cooling operation is required for maintaining the temperature in a domestic refrigerator at a desired one due to a higher temperature coolant and larger difference in temperatures inside and outside the refrigerator when the atmospheric temperature is high, for example, in summer, whereas a shorter period of time of the cooling operation is required for the same purpose due to lower temperature of coolant and smaller difference in temperatures inside and outside the refrigerator when the atmospheric temperature is low, for example, n winter. As a result of the above, a temperature-regulating corresponding to or compensating the changes in the atmospheric temperature can never be accomplished when both of the temperature-detecting devices 55 and 56 are provided at fixed positions. So it is considered effective for accomplishing a temperature-regulating being able to compensate the changes in the atmospheric temperature that, in the system shown in FIG. 6, the temperature-detecting device 55 at the inlet side of the coolant pipe 53 is always positioned shown in FIG. 6 and the temperature-detecting device 56 at the outlet side of the coolant pipe 53 is suitably changed in position with the changes in the atmospheric temperature. That is, for maintaining the temperature in the refrigerator at the most suitable one, the temperature-detecting device 56 is attached to the cooling fin 52 at the aforementioned position 56 in summer when the atmospheric temperature is high, at a position 57 shown in FIG. 6 in winter when the atmospheric temperature is low, and at a position 58 shown in FIG. 6 between said positions 56 and 57 in spring and autumn when the atmospheric temperature is middle at an intermediate level, and the aforementioned differential initiating and stopping of the cooling operation is carried out at the points of time when the temperature-detecting devices make the switching operations at the predetermined temperature respectively. However, the changes in position of a temperature-detecting device is very troublesome and it is practically impossible to make such changes in position of a detector in a day during which the atmospheric temperature varies. Accordingly, it is further considered that four temperature-detecting devices are attached to the cooling fin 52 at the positions 55, 56, 57 and 58 shown in FIG. 6 and the cooling operation is initiated and stopped differentially at the points of time when the device 55 at the inlet side of the pipe 53 and one of the devices 56, 57 or 58 selected according to the degree of the atmospheric temperature make the switching operations at the predetermined temperature respectively. In this case, however, there are such defects that the manual selection of one of the devices 56, 57 or 58 is very troublesome and is apt to be forgotten and also the automatical selection of said device makes the apparatus for said selection complicated to such an extent that said automatic selection can never be employed in practice.

The above stated circumstance in regulating temperature of a domestic refrigerator are also true in regulating temperature of an apparatus for maintaining temperature constant other than a domestic refrigerator such as a usual refrigerator, heating apparatus for rooms, air conditioning apparatus or the like.

Accordingly, it is the primary object of the present invention to provide a novel temperature-regulating system in apparatuses for maintaining temperature constant which enables to regulate temperature in said apparatuses automatically in correspondence to the changes in the atmospheric temperature, is easy in handling or operation and has a simple construction.

The temperature-regulating system according to the present invention is characterized in that, in a temperature-regulating system wherein a heat-exchanger regulating apparatus or machine is initiated and stopped differentially at the points of time when a pair of temperature-detecting devices detect predetermined temperatures peculiar to the respective devices whereby a constant temperature is maintained. First and second temperature-detecting devices for detecting first and second predetermined temperatures respectively are attached to a heat-exchanger at suitable positions thereof respectively, a third temperature-detecting device for detecting a third predetermined temperature is provided outside the heat-exchanger, and said differential initiating and stopping of the heat-exchanger regulating apparatus or machine are performed at the points of time when the first detecting device detects the first predetermined temperature and when either one of the second or third detecting devices detects the second or third predetermined temperature. That is, when the above construction is explained in comparison with the system according to the prior art shown in FIG. 6, the point of time when the first temperature-detecting device attached to the heat-exchanger detects a predetermined temperature is selected, similarly to the prior system shown in FIG. 6, as one point of time of differentially initiating and stopping the heat-exchanger regulating apparatus or machine, but there is selected, as the other point of time of said differentially initiating and stopping, the point of time when any one of the second detecting device attached to the heat-exchanger or the third detecting device provided outside the heat-exchanger, that characterizes the present invention. Owing to the presence of the third temperature-detecting device, the changes in the atmospheric temperature are compensated automatically whereby the desired maintenance of a constant temperature is accomplished without being affected by said changes in the atmospheric temperature, as detailed hereinafter. In addition, the terms "differential initiating and stopping of a heat-exchanger regulating apparatus or machine" used in this specification mean such operating system that, as can be understood from the aforementioned, the heat-exchanger regulating apparatus or machine is initiated at the point of time when one temperature-detecting device detects a predetermined temperature peculiar to said device and is stopped at the point of time when the other temperature-detecting device detects a predetermined temperature peculiar to said device so that the heat-exchanger regulating apparatus or machine is operated from the point of time when the former device detects the former predetermined temperature to the point of time when the latter device detects the latter predetermined temperature and said operation of the heat-exchanger regulating apparatus or machine is always stopped at the other period of time.

The present invention and its advantages will become more readily apparent as the specification is considered in conjunction with the accompanying drawings in which:

FIG. 1 is an elevational front view of an example of a temperature-detecting device used in the temperature-regulating system according to the present invention;

FIG. 2 is a diagrammatic perspective view of a part of a domestic refrigerator wherein one embodiment of the temperature-regulating system according to the present invention is employed;

FIG. 4 is a diagrammatic perspective view, similar to FIG. 2 of a part of a domestic refrigerator wherein another embodiment of the temperature-regulating system according to the present invention is employed;

FIG. 6 is a diagrammatic view of a temperature-regulating system for a domestic refrigerator according to the prior art wherein a regulating electric circuit is omitted.

Figure 3:
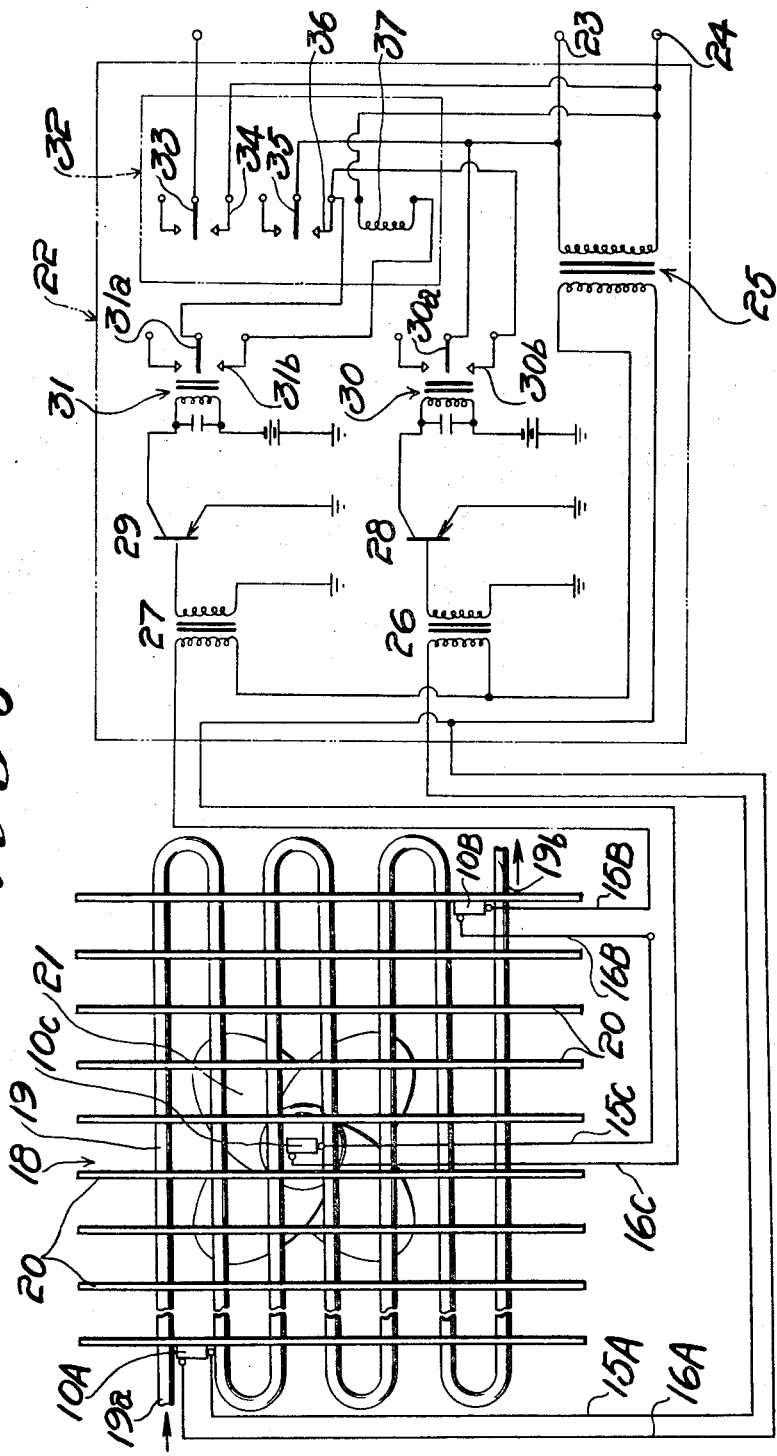
FIG. 3 is a diagrammatic view of the temperature-regulating system shown in FIG. 2.

Referring now to the drawings, there is shown in FIG. 1 an example of a temperature-detecting device 10 which is preferably used in the temperature-regulating system in a domestic refrigerator according to the present invention. Said device 10 is so constructed that the device is able to detect a temperature of 0°C by utilizing the difference in resistivity of water between the liquid state and the solid state and substantially same with the temperature-detecting device disclosed and claimed in Japanese Pat. publication No. 21,074/70, U.S. Pat. No. 3,514,735, French Pat. No. 1,559,841, Italian Pat. No. 827,939 and British Pat. No. 1,190,671 by the inventor of the present invention.

As is well known, water as usually obtainable, such as mains water, contains small amounts of other components, and therefore has a relatively low resistivity, that is, a considerable electric conductivity, whereas ice which comes from such water has a high resistivity, that is, does not have any substantial electric conductivity. The temperature-detecting device 10 shown in FIG. 1 is based on the above physical phenomenon and detects a temperature of 0°C accurately.

The temperature-detecting device 10 shown in FIG. 1 comprises a cylindrically shaped housing 11 of metal, water 12 located in the housing 11, a plug 13 of nonconducting material sealing the upper opening of the housing 11, an electrode 14 inserted through the plug 13 into the housing 11 so as to immerse the electrode in the water 12, a terminal 15 connected to the housing 11 and the other terminal 16 connected to the electrode 16. Therefore, the resistivity between the terminals 15 and 16 is considerably small when the water 12 is in liquid state, whereas said resistivity is high when the water 12 is in solid state.

When an electric potential is applied between the terminals 15 and 16 in the device 10 shown in FIG. 1, an electric current flows between said terminals 15 and 16 when the water 12 is in liquid state and such a current never flows substantially when the water 12 becomes solidified into ice at 0°C whereby a temperature of 0°C is detected. Therefore, the device 10 acts as a switch operating at 0°C and can be employed for regulating conditions in a domestic refrigerator or the like by connecting a regulating electric circuit to the terminals 15 and 16 of the device 10 so as to regulate said conditions at 0°C. An alternate potential is preferably applied, superior to a direct potential, between the terminals for avoiding fears of electrolysis of the water 12 and electric corrosion of the housing 11 or the electrode 14.

When the device 10 is desired to detect a temperature below 0°C, water containing a suitable amount of chemical compound effecting the descent of the freezing point of water may be used in place of the usually obtainable water 12. There can be used for said purpose such water containing, for example, 5.9 wt. percent of calcium chloride (freezing point: $-3°C$), 19.9 wt. percent of calcium chloride (freezing point: $-17.4°C$), or 30.0 wt. percent of propylene glycol (freezing point: $-14.0°C$). A temperature-detecting device employing such water having a freezing point below 0°C can be used for regulating temperature in a usual refrigerator.

Next, there is shown in FIG. 2 and 3 a domestic refrigerator wherein one embodiment of the temperature-regulating system according to the present invention is employed. The system shown in FIG. 2 and 3 will be described first in comparison with the aforementioned system according to the prior art shown in FIG. 6. In the domestic refrigerator shown in FIG. 2 and 3, there is provided a circulating coolant pipe 19 to which a number of spaced cooling fins 20 are fixedly attached whereby a heat-exchanger consisting of the coolant pipe 19 and the cooling fins 20 is formed in the cooling portion 18 of the domestic refrigerator. The air in the refrigerator is forcedly brought into convection current by a fan 21. Similarly to the temperature-regulating system shown in FIG. 6, a first temperature-detecting device 10A is attached to the coolant fin 20 at a position near the inlet 19a of the pipe 19 and a second temperature-detecting device 10B is attached to the cooling fin 20 at a position near the outlet 19b of the pipe 19 so that temperature in the domestic refrigerator is maintained at a most desirable one, namely about from 1°C to 2°C by means of the differential initiating and stopping of cooling operation detailed before in conjunction with the prior system shown in FIG. 6 by using said first and second detecting devices when the atmospheric temperature is high, for example in summer. In contrast with the prior system shown in FIG. 6, there is further provided in front of and outside the cooling fins 20 a third temperature-detecting device 10C which compensates the changes in the atmospheric temperature when said temperature becomes low and the provision of this third temperature-detecting device 10C outside the heat-exchanger, the cooling fins 20 in this case, characterizes the present invention. Each of the first, second and third detecting devices 10A, 10B and 10C is such that is shown in FIG. 1. In the temperature-regulating system shown in FIG. 2 and 3, the differential initiating and stopping are carried out by using the first and second detecting devices 10A and 10B in the case where the temperature of air in the refrigerator is higher than a predetermined one, 0°C in this case, at the point of time when the second detector 10B detects a predetermined temperature, 0°C is this case, and said differential initiating and stopping are carried out by using the first and third detecting devices 10A and 10C in the case where the temperature of air in the refrigerator reaches the predetermined one, before the second detecting device 10B detects the predetermined temperature, due to the atmospheric temperature being low. Said differential initiating and stopping of cooling operation by using a combination of the first and second detecting devices or the first and third detecting devices enable to regulate temperature in the refrigerator without affecting from the atmospheric temperature, that will be detailed hereinafter in conjunction with FIG. 3.

As shown in FIG. 3, the third temperature-detecting device 10C is connected to the second temperature-detecting device 10B in the series manner and a regulating electric circuit 22 is connected to thus derived terminals 15A, 16A and 15B, 16C of the detectors. The circuit 22 regulates or controls the circulation of coolant through the pipe 19 by starting or stopping the cooling apparatus or compressor and is operated itself in accordance with the state of the devices 10A, 10B and 10C. The input terminals 23 and 24 of the circuit 22 are connected to a power source (not shown) and to the terminals 15A, 16A and 15B, 16C through a transformer 25. When the resistance between the terminals 15A and 16A and between the terminals 15B and 16C, respectively, is low, considerable electric current flows from the power source through the detectors 10A, 10B and 10C. This current is introduced into transformers 26 and 27. The outputs of the last-mentioned transformers are connected to respective transistors 28 and 29 at respective inputs (base electrodes) thereof, causing the transistors 28 and 29 to be operated. The transistors in turn amplify the current, to operate micro-relays 30 and 31 connected at the outputs of respective transistors 28 and 29. The operation of the micro-relays operates relay 32 accordingly.

The operation of the temperature-regulating system of FIG. 3 is as follows:

Before the refrigerator is cooled, considerable current flows between the terminals 15A and 16A and between the terminals 15B and 16C, as described above, because the water in respective detectors 10A, 10B and 10C is in a liquid state. This current operates the transistors 28 and 29 through the respective transformers 26 and 27 and, as explained above, is amplified by the transistors to operate the micro-relays 30 and 31. As contacts 30a, 30b and 31a, 31b of the respective micro-relays 30 and 31 are closed, the relay 32 operates to switch contacts 33 and 34 thereof which operate the cooling apparatus or machine or compressor (not shown) to provide a flow of coolant through the pipe 19. The flow of coolant, in turn, causes the refrigerator to be cooled. As the refrigerator cools, the water in the first detector 10A at the inlet side of the pipe 19 begins to solidify until it freezes at a temperature of 0°C. The freezing of the water in the detector 10A produces a high resistance between the electrodes thereof and causes the flow of electric current therethrough to be cut off whereby the operation of the micro-relay 30 is stopped. In this state, however, the relay 32 is maintained in an operation state and the switch elements 33 and 34 thereof remain in contacting engagement because contacts 35 and 36 provided in the relay 32 remain in contacting engagement owing to the presence of a coil 37. Thus, the cooling of the inside of the refrigerator continues. As the cooling proceeds, any one of the second or third detectors 10B or 10C arrives first at a non-conducting state. That is, the water in the second detector 10B becomes solidified first when the atmospheric temperature is relatively high due to the small cooling rate of the air in the refrigerator corresponding to said high atmospheric temperature, and the water in the third detector 10C becomes solidified first when the atmospheric temperature is relatively low due to the large cooling rate of the air in the refrigerator corresponding to said low atmospheric temperature. When any of the water in the second or third detectors 10B or 10C becomes solidified or freezes at 0°C, resistance between the terminals 15B and 16C always becomes high whereby the contacts 31a and 31b of the micro-relay 31 are opened. Thus, the relay 32 ceases to operate. The switch elements 33 and 34 in turn open and the cooling apparatus or machine (not shown) no longer supplies coolant to the pipe 19 whereby the cooling operation is perfectly stopped so that the temperature within the refrigerator begins to rise.

The rise in temperature within the refrigerator causes the water in the second or third detector 10B or 10C having frozen first to begin to change into a liquid state and once again causing the contacts 31a and 31b of the micro-relay 31 to be closed. This, however, does not operate the switch contacts 33 and 34 due to the opened state of the contacts 35 and 36, and the relay 32 also remains non-operative. As the temperature continues to increase, the water in the first detector 10A at the inlet side of the pipe 19 begins to melt and the resistance between the terminals 15A and 16A becomes low, so that the contacts 30a and 30b of the micro-relay 30 are closed. The relay 32 is then operated and the contacts 33 and 34 thereof are closed whereby the cooling apparatus or machine once again begins to operate. Thereafter, the system shown in FIG. 3 repeats the above operation.

As detailed in the above, in the temperature-regulating system in a domestic refrigerator shown in FIG. 2 and 3, the cooling operation is stopped by detecting the non-conducting state between the terminals 15B and 16C of the second and third detectors 10B and 10C connected to each other in series by utilizing the phenomenon that any one of the second detector 10B attached to the cooling fin 20 at the outlet side thereof or the third detector 10C provided in front of and outside the fin 20 first reaches a non-conducting state in correspondence to the degree of the atmospheric temperature. So, frost having attached on the cooling fins 20 during the cooling operation dissolves and is removed perfectly, the excessive cooling in the refrigerator is never caused and the maintenance of high cooling efficiency and an approximately constant temperature are achieved even when the atmospheric temperature changes variously. In addition, in the system shown in FIG. 2 and 3, the first and second detecting devices 10A and 10B may be attached to the coolant pipe 19 at the inlet and outlet sides thereof respectively.

Further, when it is desired to operate the refrigerator until below the temperature of 0°C, a suitable amount of chemical compound effecting the descent of the freezing point of water may be added to the water in the detectors 10A, 10B and 10C, as detailed before.

Although the second and third temperature-detecting devices 10B and 10C are connected in a series manner in the embodiment shown in FIG. 2 and 3, the system may be constructed in such a manner that the aforementioned type of regulating circuit 22 is connected between the terminals of the first and second detectors 10A and 10B and the terminals of the third detector 10C are connected to the power source so as to cut off the source at the point of time when said detector 10C detects the predetermined temperature whereby the cooling operation is stopped. In short, in the system according to the present invention, the cooling operation is initiated and stopped differentially at the points of time when the first and second detectors 10A and 10B or the first and third detectors 10A and 10C detect the respective predetermined temperatures.

Figure 5:
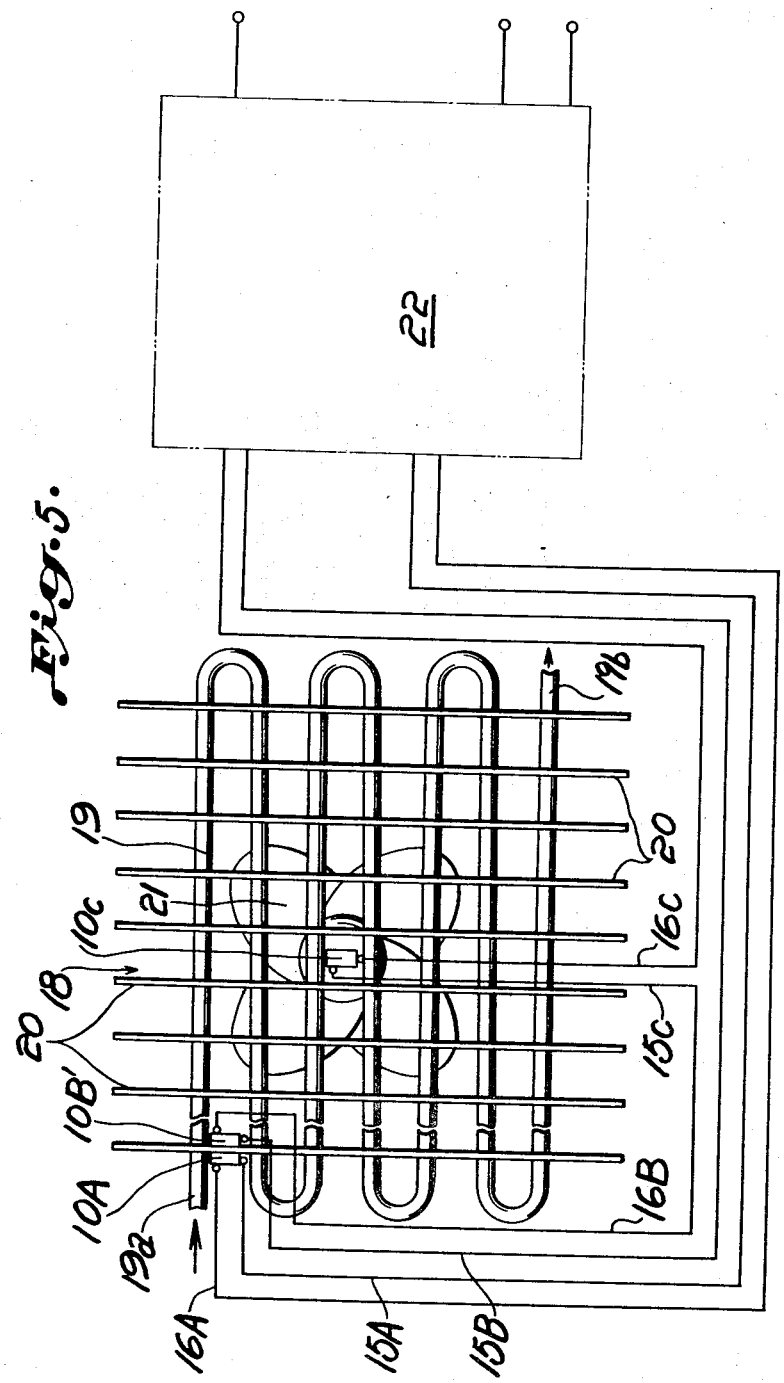
FIG. 5 is a diagrammatic view, similar to FIG. 3, of the temperature-regulating system shown in FIG. 4 wherein a regulating electric circuit is omitted.

In FIG. 4 and 5, there is shown a domestic refrigerator wherein another embodiment of the temperature-regulating system according to the present invention is employed. In this improved embodiment, the first and the third temperature-detecting devices 10A and 10C having the same construction as the one shown in FIG. 1 are provided, similarly to the first embodiment shown in FIG. 2 and 3, to the cooling fin 20 at the inlet side of the pipe 19 and outside and in front of the fin 20 respectively, whereas the second temperature-detecting device 10B is attached to the cooling fin 20 at the same position with the first detecting device 10A. In the second detecting device 10B', there is accomodated water containing a suitable amount of chemical compound effecting the descent of the freezing point of water so that said detector 10B switches at a suitable predetermined temperature below 0°C. Said predetermined temperature of the device 10B' is chosen in such that is the temperature of the first device 10A of the first embodiment shown in FIG. 2 and 3 when the second device 10B of said first embodiment reaches the predetermined temperature of 0°C. In other words, said predetermined temperature of the device 10B' is chosen in such a manner that the temperature of the refrigerator is maintained at a most desirable one, namely about from 1°C by means of the differential initiating and stopping of cooling operation by using said first and second devices 10A and 10B' of this second embodiment when the atmospheric temperature is high, for example, in summer. In addition, though a temperature-detecting device of the type shown in FIG. 1 and having a predetermined temperature below 0°C is used as the second temperature-detecting device 10B' in this second embodiment for the purpose of the better understanding, it is, in practice, more reasonable to use as the second device 10B' a temperature-detecting device being variable in detecting or predetermined temperature such as a variable thermometer with an on-contact or off-contact.

In this second embodiment shown in FIG. 4 and 5, too, the second and third devices 10B' and 10C are connected to each other in series manner and a regulating circuit 22 (not shown) same with the one of the first embodiment shown in FIG. 2 and 3 is connected to thus derived terminals 15A, 16A, 15B' and 16C. In addition, like numerals designate like parts throughout FIG. 2, 3, 4 and 5.

It can now be understood easily that the system shown in FIG. 4 and 5 operates in entirely the same manner and exhibits the same advantages with the one shown in FIG. 2 and 3. That is, if the third device 10C is removed and the differential initiating and stopping of the cooling operation are carried out by using the first and second devices 10A and 10B' only in this system, maintainance of constant temperature in correspondence to or in proportion to the atmospheric temperature becomes entirely impossible for the same reason as stated before in conjunction with FIG. 6. Further, it is very troublesome and is accompanied with a lot of disadvantages to change the detecting or predetermined temperature of the second device 10B' in proportion to or in correspondence to the atmospheric temperature for lengthening or shortening the period of the cooling operation corresponding to a high or low atmospheric temperature, as can easily be understood from the description given before in conjunction with FIG. 1. In contrast with the above, the system shown in FIG. 4 and 5 enables to regulate the temperature in the refrigerator automatically. Furthermore, owing to the attaching of the first and second devices 10A and 10B' at a same position of the cooling fin or heat-exchanger, the construction of the regulating system can be made simpler by using common attaching means for said device or by constructing the first and second device in one body. In addition, although the first and second devices are attached to the cooling fin at the inlet side of the coolant pipe so as to employ the temperature of the fin at the inlet side as a basic temperature for initiating the cooling operation by detecting said temperature with the first device and such basic temperature at the inlet side of coolant is preferable in case of a refrigerator or the like, the attaching position of the devices 10A and 10B' on the heat-exchanger is never limited to said position in the present invention particularly in case of an apparatus for maintaining a high constant temperature such as heating apparatus for living rooms.

Further, there has been shown an example of temperature-detecting device which utilizes the change in state of water, said detecting device employed in the system according to the present invention is never limited to the above one and may be any of well-known temperature-detecting devices such as thermocouple, thermister or the one used in a usual thermostat. The temperature-detecting device is, furthermore, never limited to such that performs switching operation at a predetermined temperature and any of such one that feeds a signal to an operating system or a regulating circuit for the heat-exchanger regulating apparatus or machine so as to initiate said apparatus or machine differentially may be used.

Further, it is not necessarily required to predetermine the detecting or switching temperatures of the first, second and third devices in a same one and, for example if the switching temperature of the third device 10C in the first and second embodiments shown in FIG. 2, 3 and 4, 5 is predetermined at plus 5°C, no frost is produced on the heat-exchanger, namely the coolant pipe and the cooling fins. In short, the predetermined or detecting temperature of the first, second and third temperature-detecting devices may be chosen optionally in accordance with the concerned regulating of temperature.

Furthermore, the detecting temperature of each of the devices may be made variable. For example, in the case when the switching temperature of the third device 10C in the first and second embodiments shown in FIG. 2, 3 and 4, 5 is made variable by using, for example, an on-contact or an off-contact, it becomes possible to vary said switching temperature of the third device according to the kind or amount of substances being stored in the refrigerator so as to achieve a better keeping of the substances.

As can be easily understood from the above, the temperature-regulating system according to the present invention can be applied to such regulating system in not only a domestic refrigerator but also any of a usual refrigerator, cold-storage equipment with cooled water, heating apparatus for living rooms, air conditioning apparatus constant temperature-keeping apparatus for medical purpose or for chemical process or the like. For example, when the system according to the present invention is applied to such a regulating system in a heating apparatus for living rooms in such a manner that the operation of a pump, solenoid valve or the like for circulating heating medium is initiated and stopped differentially, the temperature of the air or wind fed from the heating apparatus is never brought too high or too low because the change in the atmospheric temperature is always compensated, so that the temperature in the living room is always maintained at a most comfortable one and a high efficiency of heating can be expected.

Next, in the temperature-regulating system according to the present invention, a heat-exchanger regulating apparatus or machine is initiated and stopped differentially at the points of time when a first temperature-detecting device provided on a heat-exchanger detects a first predetermined temperature and when a second temperature-detecting device provided on said heat-exchanger or a third temperature-detecting device provided outside the heat-exchanger detects a second or third predetermined temperature, as detailed in the above. The followings are the clear definitions of the terms "heat-exchanger" and "heat-exchanger regulating apparatus or machine".

First, the term "heat-exchanger" used in this specification includes not only heat-exchangers through which, as shown in the aforestated two embodiments, heat-exchanging medium is passed, but heat-exchangers provided with sheathed electric heaters through which electric current is flowed, heat-exchangers provided with heating cylinders having fuel-jetting type burners at the base ends thereof and the like. So, the term "heat-exchanger" can be defined as a means or device which is used for heat-exchanging for the purpose of heating or cooling.

Next, the term "heat-exchanger regulating apparatus or machine" used in this specification includes not only an apparatus or machine which, as shown in the aforementioned two embodiments, supplies heat-exchanging medium to a heat-exchanger directly such as cooling machine or heating machine, but also a flow-path changing electromagnetic valve which is operated with a solenoid so as to change the flow-path of heat-exchanging medium between a main path led to a heat-exchanger and a by-path going round the heat-exchanger whereby the amounts of the heat-exchanger so as to regulate the amounts of the heat-exchanging medium supplied to the heat-exchanger, a speed-changer which regulates the rotation speed of an electric motor for jetting fuel from a fuel-jetting type burner of the above stated heat-exchanger provided with heating cylinders, a leading and cutting-off apparatus for electric current which apparatus leads and cuts electric current supplied to a heat-exchanger provided with sheathed electric heaters, an electric potential-regulating apparatus which regulates electric potential applied to a heat-exchanger provided with sheathed electric heaters and the like. So, the term "heat-exchanger regulating apparatus or machine" can be defined as an apparatus or machine which activates and depresses the heat-exchanging operation of a heat-exchanger.

The characteristic feature of the present invention consists in the fact that there is provided outside a heat-exchanger a third temperature-detecting device and a heat-exchanger regulating apparatus or machine is initiated and stopped at the points of time when any one of said third detecting device or a second temperature-detecting device attached to the heat-exchanger and a first temperature-detecting device attached to the heat-exchanger detect respective predetermined temperatures so that compensation of the changes in the atmospheric temperature is always achieved well and automatically, that is quite impossible when the differential initiating and stopping of the heat-exchanger regulating apparatus or machine are performed by using the first and second detecting devices only. That is, the differential initiating and stopping of the heat-exchanger regulating apparatus or machine are performed, in the system according to the present invention, by using any one off the combinations of the first and the second devices or the first and the third devices so that any one of said combinations is selected automatically in correspondence to the degree of the atmospheric temperature, whereby the changes in the atmospheric temperature are always compensated without changing the position or the detecting or predetermined temperature of the second detecting device. Therefore, an automatic regulation of temperature in apparatuses for maintaining temperature constant is accomplished by the present invention with no troublesome handling of the system, a high efficiency of cooling or heating and a simple construction, so that a precise regulation by using a proportional regulation process according to a conventional art also be required no longer when the system according to the present invention is employed.

WHAT IS CLAIMED IS:

1. In a temperature-regulating apparatus, a heat exchanger providing a flow path for a heat exchanging medium and having a medium inlet and a medium outlet, means for supplying a heat exchanging medium to the heat exchanger for changing the temperature of the heat exchanger, first temperature sensing means mounted on the heat exchanger at a first location for sensing the temperature of the heat exchanger at the first location, second temperature sensing means mounted on the heat exchanger at a second location for sensing the temperature of the heat exchanger at the second location, third temperature sensing means spaced from the heat exchanger for sensing the temperature at a third location away from the heat exchanger, and an electrical control circuit connected to the first, second and third temperature sensing means, each of the temperature sensing means including means for varying the electric current flowing through the electrical control circuit when the temperature sensing means senses a predetermined temperature associated with that temperature sensing means, the electrical control circuit containing means responsive to variation in the electric current flowing through the circuit for opening and closing the circuit, the circuit being opened when the first temperature sensing means senses its associated predetermined temperature and either the second or the third temperature sensing means senses it associated predetermined temperature whereby power to the medium-supplying means is shut off, the circuit being closed when either the second or third temperature sensing means senses its associated predetermined temperature and the first temperature sensing means senses its associated predetermined temperature whereby power is supplied to the medium-supplying means.

2. The structure of claim 1 in which the temperature regulating apparatus is used for cooling and the medium supplied to the heat exchanger is a cooling medium for lowering the temperature of the heat exchanger, the electrical control circuit being opened when the temperature at either the second or the third location falls to the predetermined temperature for temperature sensing means at that location, the electrical control circuit being closed when the temperature at the first location rises to the predetermined temperature for the first temperature sensing means.

3. The structure of claim 2 in which the first temperature sensing means is mounted on the heat exchanger adjacent the medium inlet and the second temperature sensing means is mounted on the heat exchanger adjacent the medium outlet.

4. The structure of claim 1 in which the first and second locations for the first and second temperature sensing means are adjacent each other, the means for varying the electric current of the first and second temperature sensing means being selected so that the predetermined temperatures associated with the first and second temperature sensing means are different.

5. The structure of claim 4 in which the first and second locations are adjacent the medium inlet.

6. The structure of claim 1 in which the means for varying the electric current of at least one of the temperature sensing means permits the predetermined temperature with that temperature sensing means to be varied.

* * * * *